(No Model.) 2 Sheets—Sheet 2.

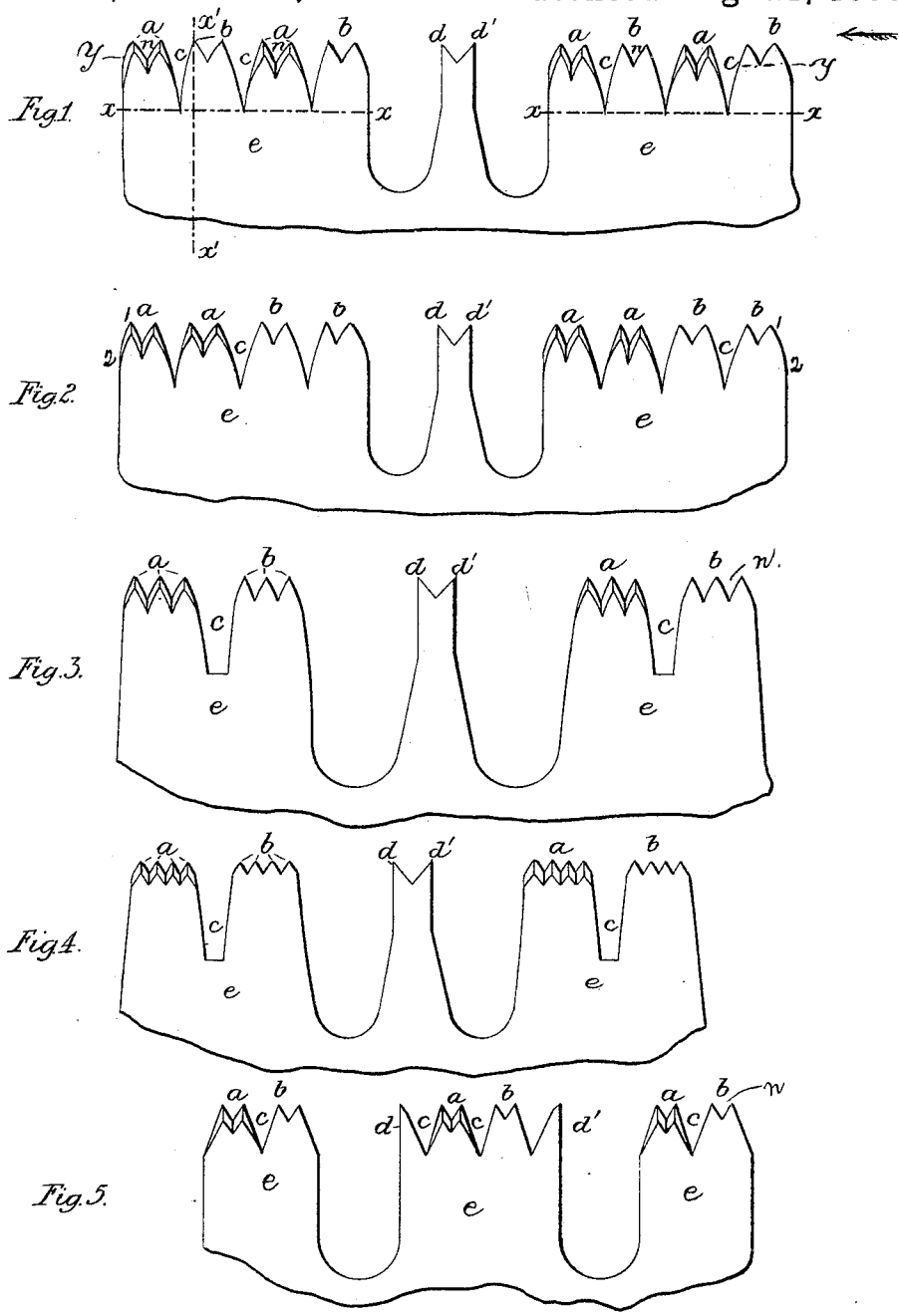

J. J. RALYA & S. L. HEINOLD.
SAW.

No. 388,305. Patented Aug. 21, 1888.

Witnesses.
Will T. Norton
A. C. Rawlings.

Inventors,
John J. Ralya.
Samuel L. Heinold
By their Attorneys
John J. Halsted & Son.

UNITED STATES PATENT OFFICE.

JOHN J. RALYA AND SAMUEL L. HEINOLD, OF ANDERSON, INDIANA.

SAW.

SPECIFICATION forming part of Letters Patent No. 388,305, dated August 21, 1888.

Application filed December 6, 1887. Serial No. 257,131. (No model.)

*To all whom it may concern:*

Be it known that we, JOHN J. RALYA and SAMUEL L. HEINOLD, of Anderson, in the county of Madison and State of Indiana, have invented certain new and useful Improvements in Saws; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention has for its object the increased cutting capacity of saws, and whereby said saws shall be operated by less power than has hitherto been employed for other saws and shall require less sharpening, and consequently prolonging their life or usefulness; and it consists in certain novel features, which will fully appear from the following description.

Figure 6:
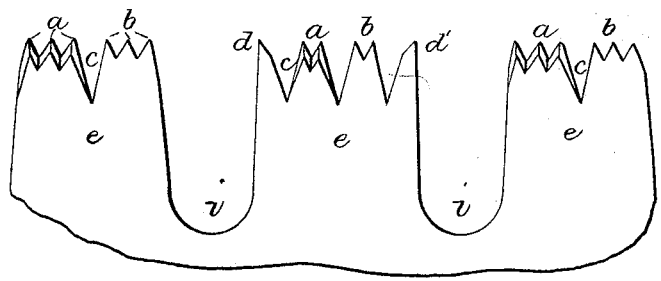
Figure 7:
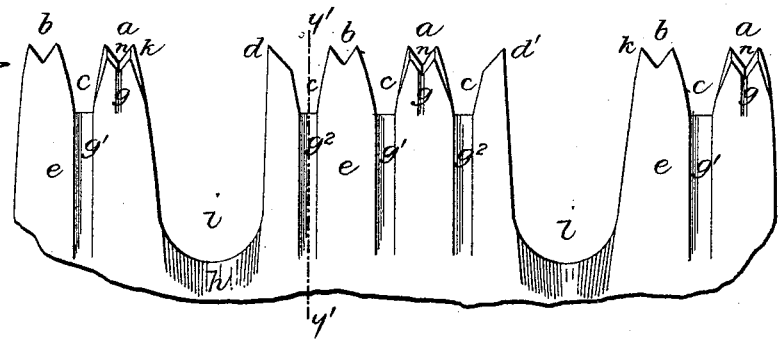
Figure 8:
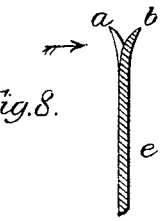
Figure 9:

In the drawings, Figure 1 represents a portion of a saw having twin teeth, each twin or pair being set on the side opposite that of the next adjacent pair. Fig. 2 represents a portion of a saw having twin teeth in which two sets of twin teeth are set on the same side, while the next adjacent two sets are set on the opposite side. Fig. 3 represents a portion of a saw having triplet teeth, each set of triplet teeth being set on the side opposite that of the next adjacent set. Fig. 4 represents a portion of a saw similar to that shown in Fig. 2, except that four, instead of twin, teeth are used. Fig. 5 represents a portion of a saw having twin teeth, every other pair of twin teeth being flanked by drag-teeth. Fig. 6 represents alternating double twin and triplet teeth, the twin teeth being flanked by drag-teeth. Fig. 7 represents a portion of one of our saws having grooves or corrugations. Fig. 8 indicates a section on the line $x'\ x'$ of Fig. 1, showing the set of the teeth below the base of the teeth. Fig. 9 indicates a section on the line $y'\ y'$ of Fig. 7, showing the grooves or corrugations.

The leading features of our invention will first be described with reference to Figs. 1 to 6, inclusive.

Two or more short cutting-points, $a$, are placed close together, all the adjacent points of each group being sharpened on the same side of the plate, and each and all having inclined cutting-edges, so that whether the saw when in use is moving forward or backward the forward edge of the forward one of such group presents an inclined edge, as do also each of the other similar cutting-points, $b$, of such group. By inclined cutting-edges I mean edges inclining backward toward the next adjacent tooth, as shown at 1 2. These cutting-teeth are "set" by groups, those marked $a$ being set in one direction and those marked $b$ being set in the opposite direction, and they are, as a general rule, set below the base of the teeth, as indicated by the line $x\ x$—that is, below the notch or notches or cuts $n$. All of each group being thus set by one and the same act of "setting," this novel mode of setting avoids the weakening of each individual point or tooth to give it its set, and at the same time allows any desired degree of set to be given without being restricted or limited by the size of the tooth itself, and as the bend is made in the full thickness of the metal constituting the plate there is no risk of cracking or damaging any individual point or cutter in the act of setting, because itself receives no direct bend or strain when setting the group, and the teeth require setting less frequently and wear longer, and, being close together, are stronger and cut the wood into fine bits, and work with less resistance. The space $c$ between two of these adjacent groups $a\ b$ is much deeper than that between the points of the teeth, and this allows the outer edge of each point or cutter to be sharpened far below the base-line $y\ y$ of these short teeth $a$ and $b$, thus increasing their cutting capacity.

The drag-teeth $d\ d'$ may be disposed or located in the plate relatively to the cutting-teeth as may be found desirable for different kinds of saws intended for different uses; but we prefer to have them located in very close proximity to and at each outside of the gangs composed of groups $a\ b$, substantially as shown, and forming a portion of the same "elevated base," $e$, in which the small close teeth $a\ b$ are cut. The gangs having these drag-teeth alternate throughout the length of a saw may alternate, as shown in Figs. 5 and 6, with a gang having no such drag-teeth. The advantages of thus flanking each second gang of teeth with its own attached drag-teeth $d\ d'$ may be in part stated as follows: In using the saw we can thereby "pass over" the drag-teeth within seven-eighths of an inch, whereas in saws generally having the same "ventilation" as in our saws, the cutting-teeth cannot well be placed a shorter distance than two to two and three-quarter inches in passing over the drag-teeth. This short distance incident to our invention enables the workman to saw timber either round or square, having a diameter of one inch, whereas by the old way timber of less than three inches diameter could not be sawed by a saw having drag-teeth. For crosscut sawing of small timber our invention will do much speedier work than a common hand-saw or buck-saw.

Another novel feature, and which we embody in any or all of our saws, as described, and which we style the "corrugated" or "grooved" feature, is as follows: Referring to Fig. 7, in which this feature is illustrated, $g$ represents furrows or grooves cut or ground in the body of the plate, thinning it down several "gages" on opposite sides of the plate between the cutting-teeth $a\ a$, respectively, and also between the cutting-teeth $b\ b$, respectively, thus leaving a much-reduced thickness at these parts, such reduction being the greatest at the notches $n$, where the outer ends of the grooves may almost meet, and the grooves being gradually shallower away from these points until they are lost in the thickness of the plate. Similar grooves, $g'$, are made between each group $a$ and its adjacent group $b$, and extend to the intermediate space, $c$. Similar grooves, $g^2$, may be also made between the cutting-teeth and their attached drag-teeth $d\ d'$, as shown. The effect is to give to the saw-plate what we familiarly style a "corrugation"—that is, a section in the line $y'\ y'$ of Fig. 7 would present to the eye the appearance of a sort of corrugation. The advantages of this furrow, groove, or corrugation are as follows: first, to assist in filing, because, the plate being thus already thinned at this point, the filing can be done much quicker between the teeth of the elevated base $e$ in the blade itself, and, second, it is a guide to follow when filing, causing a neater regularity in the teeth when filed. It also affords somewhat more ventilation or air-space. This novel feature may be applied to all or any of the teeth of our improved saws and is also applicable to all crosscut-saws, and to all other mill-saws—such as rip-saws, &c.—and whether they be straight, curved, or circular. Similar grooves, $h$, may also, if desired, be made in the plate below the large ventilating-space $i$.

Where we show two cutters $a$ or $b$ in a group we shall designate them as "twin" teeth, and style three such in a group "triplets," and four such in a group "fore-paugh," and beyond four may be called "multiple."

In the twin or double pointed teeth, which as made by us we deem of great importance and value, especially for crosscut-saws, not only are the points, as stated, brought close together, but the cutting-edge can be brought almost at right angles with the length of the blade, thus causing it to adhere to the wood, and at the same time not only avoiding the weakening of the teeth, but rather strengthening them (as compared with ordinary teeth) by putting a "stunt" bevel, $k$. This feature is practically of great value for causing the adherence above stated, whether the cutting-teeth be "tooth-set" or "base-set."

The triplet-pointed, four-pointed, or multiple-pointed teeth are all valuable variations from the twin-pointed style, and in some branches of work may be preferred; but for most purposes we deem the twin the most important.

It will be borne in mind that as a rule we sharpen all the teeth of one "group" $a$ of a gang on one and the same side of the plate, and those of the other and adjacent group, $b$, on the opposite side of the plate, and that between the groups $a$ and $b$ the deep narrow open space or cut $c$ allows the outer and nearly-vertical edges of the cutters to have cutting-edges nearly or quite to the bottom of such cut.

Our manner of making the points, besides its other advantages, enables us to readily convert old styles of saws into our improved ones (and this even after their teeth are pretty well worn away) by first cutting off the ends of the old teeth far enough to permit the remaining portion to be filed down or divided, so as to form two or more points $a$ or $b$, as may be desired, thus largely increasing the capacity of the saw, while also enabling it to run lighter. The length of lifetime or service of the saw seems proportionate to the number of cutting-points.

Our invention lessens the size, while increasing the number of cutter-points in a given inch or other measure of length, and, as before stated, allows of our preferred mode of setting—namely, with the bend or set below the base of the points—that is, below the bottom of the notches $n$, which are between the short teeth.

In making new saws of course a wider range is permitted as to length, breadth, and number of points in each group $a$ or $b$, and also as to the place at which the bend for setting may be made, and as to the relative position and number of the drag-teeth used in a particular style of saw.

In every case, whether in old or new saws, the retention or permanent hold of the set is far superior to that of any saw known to us, for it is evident that the mere wearing away of the points or the resharpening of the same has but a slight effect on the set, because the line of the bend is so far below the base of the points.

We find that saws made in accordance with our improvements last about twice as long as usual and run straight and far easier, and cut faster, and it will be evident that the closely-set and short cutters of each group will cut quicker than if longer and farther apart, and will break off the wood better and admirably prepare the way for the other cutting-edges, which extend below the base of these cutters.

In some cases we set two adjacent groups $a$ and $b$ of similar points in one and the same direction and set the next two adjacent groups in the opposite direction. (See Fig. 2.)

As compared with other saws, we find a great advantage in grouping the tips or points in pairs or twos and near together, as we can give much more flare and a steeper angle than we can in any ordinary saw-tooth.

We prefer to give two bevels to the tips or points, the one terminating at the extremity being more abrupt or less acute than that farthest from such tip. This provision gives greater strength to the body of the points, stiffening them and preventing their crumbling away, and yet there is afforded for the outside edges of each pair long cutting angle-edges having a greatly-increased cutting capacity, far beyond any saws known to us. In the triplet points we also prefer to give this short second bevel to the inside of the two outside points.

The plate may, if desired, have a slightly diminishing thickness from its main body out to the tips of the teeth.

The peculiar shape of the twin, triplet, &c., pointed teeth with the outer edges beveled and set at such an angle outward from the plate, which a single-pointed tooth could not stand, causes the points to adhere to the wood, and the stunt bevel between the points not only strengthens these points, but in the triplets the center one is protected and defended at both sides by its next adjacent teeth, and has but light work to do. Trembling and consequently poor work are avoided, because the elevated base holds the teeth so rigidly, and this is a great protection against knocking off the points of the teeth.

Small timber requires less ventilation than large, and soft requires more than hard timber.

There is great gain in having a number of teeth in a group and in the increased ventilation. We get about three to four or more times the number of cutting-teeth in a given space, and about four times the ventilation. The closer and smaller the teeth the greater is the ventilating space allowable in a given foot or yard.

The twin teeth (or the triplet teeth) flanked by drag-teeth may alternate with triplets having no attached or flanking drag-teeth.

When we cut off the teeth of old saws to convert them into our improved ones, we gum down into the blades at the base of the teeth, and thus make two, three, or more teeth out of every one, and the gumming increases the ventilation from three to four times, the saws thus cutting twice as fast and with one-half the power, and they remain set about three times as long and remain sharp twice as long, and the saw will last about three times as long as it would before being altered.

The twin teeth, which may be styled "split" teeth, are preferably made by splitting centrally a single-pointed tooth and spreading these parts one to the right and one to the left. This does not require the cutting or filing away of any steel from the tooth, but simply divides it. This throwing outward the two points and bringing their outer cutting-edges nearly at right angles with the blade causes the teeth to take hold of the wood and to adhere more closely to it.

We use no inserted teeth of any kind. The cutting-teeth and drag-teeth are all integral with the plate.

We claim—

1. A saw having groups of closely-adjacent cutting-teeth in which the outer cutting-edges of the outer teeth of the group incline slightly inward toward the adjacent teeth of the group, and in which all the teeth of each group are set in one and the same direction and those of the adjacent group of the same gang are set in the opposite direction, substantially as shown and described.

2. A saw having in the same elevated base a gang of cutting-teeth composed of two groups of teeth, all the teeth of one of such groups being set in one direction and all of those of the other group being set in the opposite direction, and also drag-teeth closely flanking such gang at each side on the same elevated base, substantially as shown and described.

3. A saw having groups of adjacent cutting-teeth having outer edges inclined inward toward the adjacent teeth of the group, all of each group being set in one and the same direction, the line of such set or bend being below the bottom of the notches $n$, all as set forth.

4. A saw having groups of closely-adjacent cutting-teeth, the outer edges being inwardly inclined, all set in one direction, and similar adjacent fellow groups set in the opposite direction, both such groups being set at a line or point below the base of the teeth, all substantially as set forth.

5. A saw having its cutting-teeth set in groups, each group being set in a different direction from that of its next adjacent group, and having the opposite surfaces of its plate reduced or corrugated into grooves substantially at right angles to the length of the plate, these grooves or channels being opposite each other on opposite sides of the plate and inclining away from each other from the bottom of the notches or cuts which are between the teeth, substantially as set forth, and for the purposes described.

6. A crosscut-saw having teeth sharpened at their tips to a double bevel, as set forth, and made in gangs composed of two groups, those of one group being all sharpened on one side of the plate and those of the other on the opposite side, and all of each group being set below the base of its teeth, substantially as set forth.

7. A saw having gangs of teeth closely adjacent in groups and sharpened to a double bevel, as set forth, all the teeth of one group being sharpened at the same side and set in one direction and those of its adjacent group sharpened at the other side and set in the opposite direction, such gangs alternating with drag-teeth.

8. In a saw having groups of small teeth at the top of elevated bases and having a deep open space, $i$, between such bases, transverse grooves $h$, made in the body of the plate below such spaces, as and for the purpose set forth.

JOHN J. RALYA.
SAMUEL L. HEINOLD.

Witnesses:
  JOHN W. LOVETT,
  S. M. KELTNER.